Patented June 28, 1932

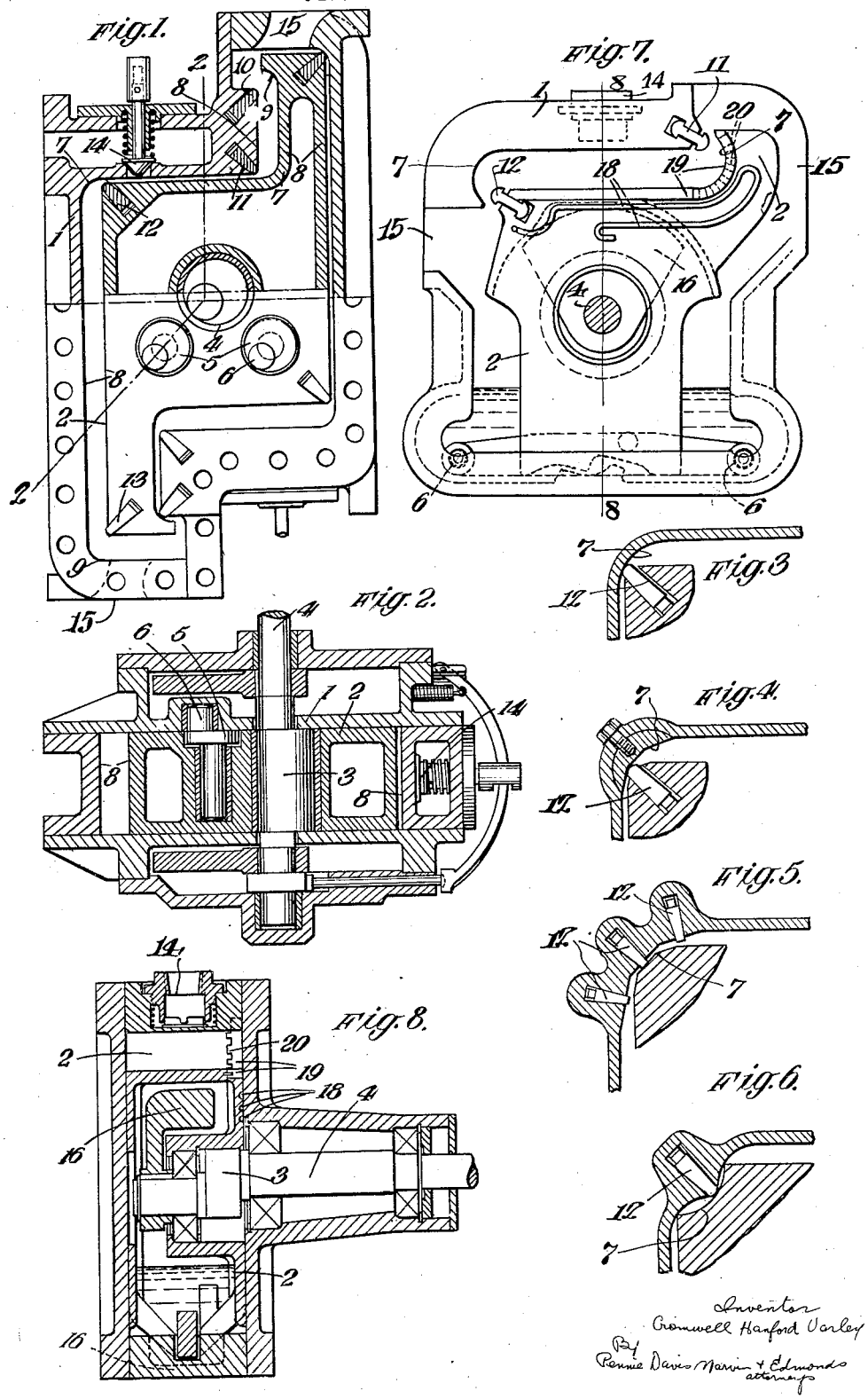

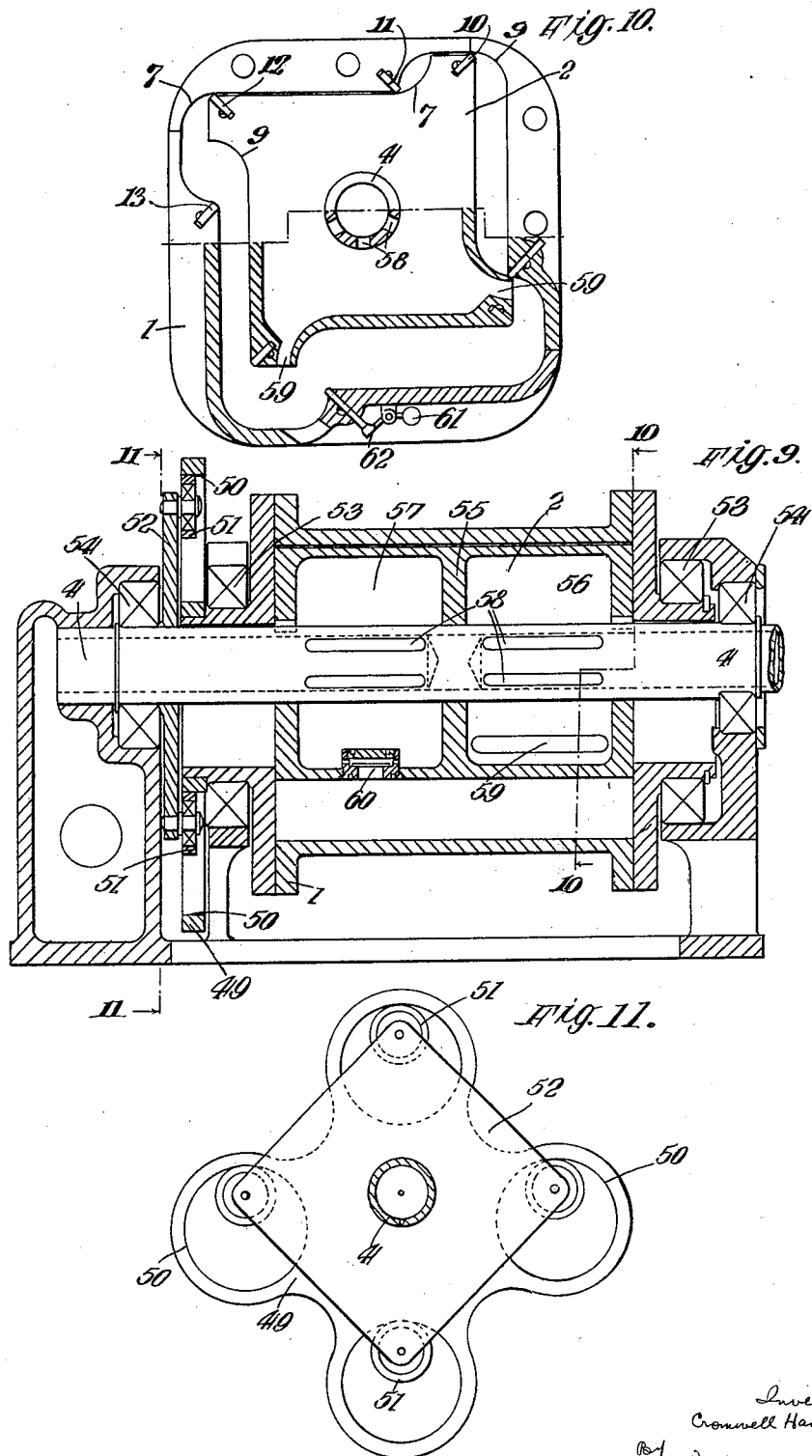

1,864,699

UNITED STATES PATENT OFFICE

CROMWELL HANFORD VARLEY, OF CORTON, NEAR LOWESTOFT, ENGLAND

ROTARY ENGINE, PUMP, AND THE LIKE

Application filed December 24, 1928, Serial No. 328,195, and in Great Britain December 31, 1927.

This invention relates to fluid actuating or actuated mechanisms or pumps, engines and the like of the kind in which two members conveniently termed a displacer and a casing perform in relation to one another a paracyclic movement, that is to say a movement such that each and every point of the one member describes in relation to the other member a circular path of one and the same radius (as is the case in for instance a locomotive driving wheel coupling- or tie-rod whereof each point moves in a circle in relation to the frame of the locomotive), said members being adapted to provide between them a space or conduit the volume of which increases and decreases during the relative motion and which is determined or sealed by two travelling contacting zones between the two members, suitable port or valve means for ingress and egress of fluid to said space being also provided so that the mechanism may work as a fluid actuator or pump or be acted upon by fluid to work as an engine or prime mover.

In known arrangements of the above kind direct contact is established between a moving rotor member and a fixed casing member which define the space referred to and such contact is depended upon not only to effect the necessary sealing of the space but also to produce or determine the desired paracyclic motion of one member relatively to the other. While such arrangements may be suitable for low pressures and speeds such as are met with in water meters or the like where the difference of pressure between inlet and outlet may amount to only a few ounces per square inch, they are inadequate in cases where a substantial pressure difference is employed as for instance in air compressors, pumps or prime movers. They are subject to disadvantages for instance due to heavy stresses and rubbing pressures arising at the regions of contact on both members, these regions further being line contacts quite unsuitable for withstanding high stresses and incapable of efficient lubrication. At high speeds of the rotor within the stator casing the increased centrifugal forces generated further seriously increase such undesired pressures and consequent wear of the parts, and while allowance might be made for employing a balance weight to balance the moving member as a whole this provision will not suffice to overcome the effects on the walls due to the centrifugal force. Again, any definite contact at the two zones enclosing the volume changing spaces, such as may be obtained by extreme accuracy in construction and is essential when gaseous fluids are to be dealt with is soon rendered uncertain as wear takes place.

The object of the present invention is to provide improvements in the construction of so called paracyclic fluid actuating or actuated mechanism operating as above and to so define and arrange the relatively moving parts as to overcome such disadvantages as those referred to and to render the apparatus suitable for operating with liquids or gases if desired under the severe conditions met with and at very high speeds often employed in say compressor and/or say engine work.

The invention consists in a fluid actuating or actuated mechanism utilizing relative paracyclic motion between two members providing between them and within two travelling contacting zones a closed space of increasing and decreasing volume, the relative motion of the two members being determined independently of direct contact between them and the contacting or sealing being effected through elements provided on and adapted for such movement relatively to either or both of said members as to ensure contacting with the required pressure and provide for the taking up of wear.

The invention further consists in mechanism according to the preceding paragraph in which a moving member is provided with balancing means.

The invention further consists in mechanism in accordance with either of the preceding paragraphs in which the paracyclic motion is determined by the action of eccentrics, cranks or the like or by travel of roller means connected to one of said members on circular paths fixed in relation to the other member.

The invention further consists in mechanism in accordance with the preceding paragraph in which with the object of eliminating centrifugal stresses from the bearings both of the members are rotatable to provide the required relative paracyclic motion between them.

The invention further consists in mechanism in accordance with the preceding paragraph in which the members are individually balanced and are uniformly rotated about separate parallel axes spaced apart by a distance equal to the radius of the paracyclic motion.

The invention further consists in mechanism in accordance with any of the preceding paragraphs in which the contacting elements are during a part of each cycle inoperative in space sealing so as to provide a clear passageway or conduit between the two moving members.

The invention further consists in mechanism in accordance with any of the preceding paragraphs in which the two relatively movable members are so shaped that the space or passageway between them is of direction changing form that is such that its outline reverses at least once in its total length say from a curvature in a left-hand sense to one in a right-hand sense or vice versa.

The invention further consists in mechanism in accordance with the preceding paragraph in which the curvatures are localized and intervening portions of the space between the members are bounded by more or less plane surfaces.

The invention further consists in mechanism in accordance with the preceding paragraph in which contacting elements which effect sealing to determine the volume changing space between the moving members are located at and co-operate with regions forming junctions between said more or less plane surfaces.

The invention further consists in mechanism in accordance with any of the three preceding paragraphs in which the opposed surfaces of the two members located between two contacting elements and co-operating surfaces are adapted during each cycle to come into close relationship or approximate contact.

The invention further consists in mechanism in accordance with any of the five preceding paragraphs in which while the closed space is maintained a comparatively sudden change in the volume thereof is arranged to occur by provision of more than one pair of contacting elements and co-operating surfaces said pairs being situated at different distances apart and being adapted in turn to cooperate in defining the fluid space.

The invention further consists in mechanism in accordance with any of the preceding paragraphs in which the contacting elements comprise strips or the like movable within grooves, slots, or other recesses provided either on the displacer member or the casing member and adapted to effect travelling contact with opposed surfaces of the other member during a determined part of the cycle substantially as hereinafter described.

The invention also consists in improvements in or relating to rotary engines, pumps and the like substantially as hereinafter described.

In order that the invention may be clearly understood and readily carried into effect it will now be described more fully with reference to the accompanying drawings which illustrate various forms of mechanism in accordance with the invention, and in which:—

Figure 1 is a view partly in elevation and partly in longitudinal section of a paracyclic mechanism suitable for use as a steam engine or air compressor, Figure 2 is a two-plane cross-section of the mechanism illustrated in Figure 1, taken on the line 2—2 of Figure 1, Figures 3 to 6 depict in section various forms of contact elements and co-operating surfaces suitable for the formation of a travelling zone of contact or closure between the rotor and stator, Figure 7 illustrates another form of mechanism suitable for use as an air compressor.

Figure 8 is a central vertical cross-section taken on the line 8—8 of Figure 7,

Figure 9 is a longitudinal section of a further form of apparatus, and

Figures 10 and 11 are respectively sections on line 10—10 and 11—11 of Figure 9.

Referring first to the mechanism illustrated in Figures 1 and 2, the stator 1 and rotor 2 are formed with co-operating parallel plane surfaces 8 connected by comparatively sharply curved surfaces as indicated. The construction of the two members is such that during a part of the cycle a passageway or conduit is formed between them which extends or turns in different directions; it may be arranged as shown to turn first in a clockwise direction and then in a anti-clockwise direction as distinct from a conduit or passageway in which the turns or bends are all in the same direction. The passageway formed in the mechanism illustrated is of a kind of S or Z formation, which turns by 90° stages through 180° in one sense and then 180° in the other sense, the end branches or limbs of the passageway or conduit being at right angles to the interposed parts. The rotor is mounted on a crank 3 fitted on a spindle 4 and is also supported and is constrained to its paracyclic motion in a manner already known by eccentrics 5 mounted on spindles 6. It thus performs a paracyclic movement with respect to the stator without directly contacting or rubbing against same and in so moving travelling zones of contact are successively formed between the curved surfaces 7 which join the plane surfaces 8 above referred to and also between curved surfaces 9 at either end of the plane surfaces, the contacts being made between these curved surfaces and strips 10, 11, 12 and 13 on the opposite members. The strip elements are capable of limited outward or protrusional and inward movement within recesses or the like and may be pressed by springs or otherwise to co-operate with the curved surfaces on the other member to form fluid-tight and wear-accommodating closures.

The contacting surfaces shown are so arranged in conjunction with the strips that they will form contact over a movement of the main crank through an angle of 90° or slightly more, the increase over 90° depending upon the amount of extra protrusion of the strip which will be allowed for taking up wear.

As shown in Figures 3 and 6, the surface as 7 opposing the spring-pressed strip as 12 may be a curved surface having a radius substantially equal to that of the paracyclic rotation of the rotor plus the radius of the curved end of the strip, or may be constructed as shown in Figures 4 and 5 with a series of facets formed at 7 on the stator or rotor, the spring-pressed strips being provided on the rotor or stator as the case may be and having a single flat end or a faceted end. When facets are used, each facet maintains contact with a corresponding parallel flat on the strip, thereby ensuring surface contact as opposed to line contact. If curved cooperating surfaces be used they are made to subtend an angle substantially equal to that turned through by the rotor during contact with the stator at the zone in question i. e. equal to the angle turned through during that part of the cycle in which a closure is to be formed by the strip in question. Each curved surface is so formed that, on the co-operating strip contacting with it, the latter is pushed home slightly but does not move in its slot during its passage over the surface, thereby minimizing wear. As will be observed, the form of the stator and rotor is such that a similar action may be performed on each side of the latter thus giving a double acting engine or compressor, but as the two sides are similar in their configuration and action it will be sufficient to give a description thereof with respect to one side only.

If the mechanism illustrated in Figures 1 and 2 be employed as a steam engine rotation is in a counter-clockwise direction, and it will be seen that, in the position indicated, zones of contact or closures are about to occur between the strips 11 and 12 and the opposing surfaces 7 of the rotor and stator respectively. The plane surfaces 8, which may be slightly recessed, of the rotor and stator between these zones of contact will then be approximately in contact and the volume enclosed between them and the travelling zones of contact or end closures will be reduced to a minimal value approximately to zero. At or about this point steam is admitted through a valve 14, this being operated by cams or other suitable mechanism such as the eccentric rod and overhead lever shown in Fig. 2 of the drawings from the main shaft 4. The rotor is thus driven in a counter-clockwise direction through a quarter of a revolution, the strips 11 and 12 maintaining contact with their opposing surfaces 7 and the volume of the chamber enclosed between these end closures and the intervening plane surfaces 8 increasing with the admission of steam. After the rotor has revolved 90° from the position in which the plane surfaces 8 are in approximate contact the strips 11 and 12 leave their respective opposing surfaces, but simultaneously the strips 10 and 13 make contact with the corresponding curved surfaces 9 on the rotor and stator respectively, and during the next quarter of a revolution the travelling zones of contact are formed by the more remotely spaced strips 10 and 13, thus producing a considerably enlarged chamber or space in which the steam may have free opportunity to expand, the change of volume taking place comparatively suddenly. On the strips 10 and 13 coming out of contact with their respective opposing surfaces 9, the closed space or chamber, having attained its maximal volume, is opened to outlets 15 at each end of the stator affording a clear passageway from one side thereof to the other and exhaust takes place during a further half revolution of the rotor, while steam is simultaneously admitted to the corresponding space on the other side of the rotor and the above described action is repeated. The engine as above described has two dead centres, and if it is desired to obviate this, the strips 10 and 13 and the respective opposing surfaces 9 may be made to continue contact for, say, 30° more than shown. By this means steam by-passed into both sides of the engine will start it when in any position.

If the mechanism is to be used as an air compressor, rotation is in a clockwise direction, the apertures 15 serving as inlets and the valves 14 as non-return outlet valves. It will be seen that as the volume of the chamber in which the air is compressed is reduced from a certain maximum value represented by the space enclosed between the strips 10 and 13 to approximately zero. The volume change again being comparatively sudden, the mechanism is particularly applicable for the purposes of compressing air. In previously proposed devices operating on the paracyclic principle reduction of the operating space to zero has not, so far as I am aware, been possible and hence such devices have not been suitable for use as air compressors.

Another form of mechanism particularly suitable for use as an air compressor is illustrated in Figures 7 and 8. In this arrangement, the rotor 2, which is provided internally with a balance weight 16, is formed with only one series of co-operating surfaces for defining a volume-changing space utilized for the air compression. The strip-elements may be of any alternative forms illustrated in Figures 3 to 6 inclusive, instead of the particular form illsutrated in Figure 7. In the present case, however, the strips and their opposed surfaces are arranged to contact for 120° movement of the rotor. In this mechanism, the single volume-changing space is that located along the top of the rotor 2 between the curved surfaces 7 and the contacting elements 11 and 12, and air for compression is admitted into the conduit around the rotor through one or both of the openings 15, 15, and trapped between the closures, where it is compressed and escapes through the valve 14, shown in section in Figure 8. The rotor is driven through a crank 3 supported by a shaft 4 and is, as before, constrained to its desired motion by eccentric means like those shown in, and described with reference to, Figures 1 and 2, these eccentrics being carried on spindles at 6, 6, and the lower part of the rotor being immersed in an oil sump constituted by the lower part of the casing 1 for lubrication purposes. In Figure 7, 18 is an oil groove located in the rotor side and to which oil may be fed in any suitable manner. The rotor is fitted, on either or both sides local to the volume changing space above referred to, with packing pieces 19, which are straight except local to the curved closure regions 7, where they are also curved to follow the edge of the rotor. These strips are pressed out laterally by suitable springs so as to form a fluid-tight joint. When the space defining closures are formed over the curved surfaces 7, 7, any tendency for air to escape between the packing pieces 19 and under the strip element may be prevented by providing the curved portion of the packing piece with teeth, indicated by the dotted lines 20, fitting into complementary serrations in the curved edge or side of the rotor.

In the arrangements above described by the inclusion of bearings for defining the paracyclic motion of the displacer within the casing and avoiding direct rubbing between the space defining surfaces of these members and by providing the separate elements for effecting the contacting and sealing of the fluid spaces difficulties for instance due to the stresses accruing from high speed running are substantially avoided. However, in cases where a heavy displacer is employed and/or where the speeds become such that the centrifugal forces would normally require bearings of such a size as to become unwieldy or where the nature of the fluids to be dealt with require that such bearings be located outside of the mechanism the form of the invention shown in Figures 9 to 11 is conveniently employed, being improved in that the generation of centrifugal stresses on the bearings may be eliminated.

The casing 1 and displacer 2 are connected together by two or more crank mechanisms, or as shown, by the provision in a plate 49 fitted to the casing member of a plurality of circular tracks 50 around which there is arranged to roll a corresponding number of rollers 51 carried by a plate 52 on the displacer shaft 4, the dimensions and disposition of the tracks and rollers being such that cooperating pairs thereof have their respective centers displaced relatively by the radius of the paracyclic circle so as to yield the desired paracyclic movement between the members. In addition both the members are mounted respectively in bearings 53, 54 to rotate about parallel axes spaced apart a distance equal to that of the radius of the paracyclic movement. Under these conditions both the members will rotate about their respective axes at an equal and uniform speed, and at the same time there will be a relative paracyclic movement between them. Since, however, the respective speeds are equal and uniform, assuming that the members are individually balanced about their respective axes, there will be no unbalanced stress on the bearings. The displacer is formed as a hollow structure divided by a partition 55 transverse to the axis into two chambers 56 and 57 to and from which the fluid is respectively supplied and exhausted by passages and apertures 58 in the shaft 4. The fluid issues from the inlet chamber 56 through apertures 59 in the surface of the displacer into one of a series of four spaces which are successively formed, between the displacer and the casing. In these spaces it is compressed or expanded according to the function of the mechanism and then passes through a corresponding aperture 60 in the surface of the displacer into the outlet chamber 57 and thence to exhaust through a second passage in the shaft 4. The passageways or ports 60 and 59 alternate round the displacer, the former ports being located one in each of the flat surfaces between adjacent pairs of closure-forming elements as 10, 11, 12 and 13, and co-operating curved regions at 9 and 7, 7 and 9 respectively, the latter ports being located closely adjacent the elements 10, 12 etc. so as to become isolated from the spaces formed between intervening pairs of closures. Suitable non-return valves may be fitted say as shown to the apertures 59 and 60 or elsewhere as may be required to regulate the passage of the fluid in order that the particular function to which the mechanism is put may be performed. The contacting strips as 10 and 12 on the displacer which point away from the centre of rotation may be kept in contact by centrifugal force acting directly on them and those on the other member which point toward the centre of rotation may be directed inwardly by the action of centrifugal force on a weight 61 applied by means of a bell-crank lever 62 to the back of the strip to keep it in contact against its centrifugal tendency to fly outwards. In the mechanism above described, although the shaft 41 represents the only means for driving the mechanism either of the rotating members may serve as the driven or driving member, and rotary motion may be applied to or taken from the mechanism according as it is employed as a compressor pump or the like, or as an exhauster or engine. Thus, since each member rotates in space about a fixed axis, the drive to or from the members can be applied or taken from, say, a belt pulley fixed conveniently to one of the nut flanges of the member 1 shown in Figure 9.

It will be realized that the number of spaces enclosed between opposed surfaces and zones of contact or end closures may be different from those in the examples above given; for instance, the construction might be such that there are three such spaces, the general outline of the opposing surfaces of the displacer being that of an equilateral triangle.

What I claim and desire to secure by Letters Patent of the United States is:—

1. Mechanism for pumping or being driven by fluids comprising a casing, a displacer situated eccentrically therein and coupled thereto by means permitting movement of the one in relation to the other, means constraining such movement so that one cycle consists in execution of a like circle by every point of the displacer within the casing, said displacer and casing presenting to each other surfaces codefining a conduit wholly external to the displacer and during each cycle approaching and receding without contacting, elements distributed on to protrude from said surfaces and in pairs during part of each cycle contacting with and travelling over opposed curved regions across the conduit and forming therewith fluid-tight end closures isolating an intervening portion of the conduit from the remainder while the conduit width between the intervening displacer and casing surfaces changes to vary the volume of said isolated portion, means for admitting fluid into said conduit, means for escape of fluid from said conduit, one of said last two means being located at the said volume-changing portion.

2. Mechanism according to claim 1, wherein said conduit-defining surfaces include at least one pair of parallel substantially plane surfaces and co-operating pairs of protruding elements and contacted curved regions are located at the ends of said surfaces.

3. Mechanism according to claim 1, wherein said conduit-defining surfaces include at least one substantially parallel pair positioned with respect to one another so as to approach once per cycle into close proximity to reduce the volume of said isolated portion of the conduit between pairs of protruding elements approximately to zero and said elements and said contacted curved regions being located at the ends of said surfaces.

4. Mechanism according to claim 1, wherein said conduit-defining surfaces include a pair of adjacent plane surfaces of the displacer inclined to each other and a pair of opposed surfaces of the casing respectively complementary to the first pair and co-operating pairs of protruding contacting elements and contacted regions are located at junctions of said relatively inclined pairs of surfaces.

5. Mechanism according to claim 1, including fluid passage means through the casing intermediate of a pair of said protruding elements which co-operate in the endwise definition of a volume-changing conduit portion.

6. Mechanism according to claim 1, wherein said displacer is of hollow construction including transverse partition means dividing it into two compartments, at least one opening between the conduit and each compartment, one opening serving one compartment between a pair of said elements which co-operate in the endwise definition of a volume-changing conduit-portion, any opening from the other compartment being isolated from said portion by one of said elements.

7. Mechanism according to claim 1, wherein said movement-constraining means comprise circular elements attached to one of the two members consisting of the displacer and the casing and co-operating with circular elements rotatable about pivots fixed to the other of said two members which elements are removed from the said conduit.

8. Mechanism according to claim 1, wherein said constraining means comprise elements removed from said conduit and having circular surfaces, some of said elements being rotatable about centres fixed in relation to one of the two members consisting of the displacer and the casing and others of said elements being fixed in relation to the other of said two members and having centres displaced from the centres of the first of said elements by an amount equal to the radius of the said circles executed by the displacer, and each of said rotatable elements running in one of said fixed elements.

9. Mechanism according to claim 1, including movement-constraining means comprising external linkage means consisting of a disc attached to a shaft supporting one of the two members constituted by the displacer and the casing and having a plurality of rollers on axes parallel to the axes of the said circles executed by the displacer and another disc attached to the other of said two members and provided with circular surfaces respectively accommodating and providing rolling tracks for said rollers.

10. Mechanism according to claim 1, wherein said displacer is of hollow construction including transverse partition means dividing it into two compartments, at least one opening between the conduit and each compartment one opening serving one compartment between a pair of said elements which co-operate in the endwise definition of a volume-changing conduit portion, any opening from the other compartment being isolated from said portion by one said elements, a spindle for said hollow displacer, internal passages in said spindle ports connecting said passages respectively with each of said compartments and automatic valve means in said opening from said one compartment to said conduit.

11. Mechanism according to claim 1, comprising three adjacent flat surfaces of the displacer and complementary respectively parallel flat surfaces of the casing defining a Z-shaped part of the conduit, a pair of said protruding elements and complementary opposed regions contacted thereby located at junctions of the remote limbs of said conduit-part with the intervening length, another like pair of protruding elements and complementary opposed contacted regions located at the remote ends of said limbs, one of said pairs of elements operating through part of one cycle to isolate at least a portion of said Z-shaped part of the conduit from the remainder thereof while simultaneously with one of said pair ceasing thus to operate the other pair of elements become operative for another part of the cycle to isolate at least a portion of said Z-shaped part of the conduit from the remainder, and port means to said Z-shaped part at said intervening length thereof.

12. Mechanism according to claim 1, wherein said protruding elements are adapted for ready replacement.

13. Mechanism according to claim 1, wherein said curved regions contacted by said protruding elements are provided by replaceable pieces.

14. Mechanism according to claim 1, comprising weights pivotally carried upon one of the members constituted by the displacer and the casing said weights acting endwise upon protruding elements to augment or limit the effect thereon to centrifugal force.

CROMWELL HANFORD VARLEY.